United States Patent
Haryu et al.

(10) Patent No.: US 9,365,938 B2
(45) Date of Patent: Jun. 14, 2016

(54) DIFFERENTIAL PRESSURE WATER ELECTROLYSIS APPARATUS

(71) Applicant: HONDA MOTOR CO., LTD., Tokyo (JP)

(72) Inventors: Eiji Haryu, Wako (JP); Koji Nakazawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 14/526,519

(22) Filed: Oct. 29, 2014

(65) Prior Publication Data

US 2015/0122637 A1 May 7, 2015

(30) Foreign Application Priority Data

Nov. 5, 2013 (JP) ................................. 2013-229635

(51) Int. Cl.
*C25B 9/20* (2006.01)
*C25B 1/12* (2006.01)
*C25B 1/10* (2006.01)

(52) U.S. Cl.
CPC ... *C25B 9/20* (2013.01); *C25B 1/10* (2013.01); *C25B 1/12* (2013.01); *Y02E 60/366* (2013.01)

(58) Field of Classification Search
None
See application file for complete search history.

(56) References Cited

U.S. PATENT DOCUMENTS

| | | | | |
|---|---|---|---|---|
| 5,837,110 A * | 11/1998 | Dean | ........................ | C25B 1/12 204/240 |
| 7,846,307 B2 * | 12/2010 | Taruya | ...................... | C25B 1/12 204/194 |
| 7,879,207 B2 * | 2/2011 | Dalton | .................. | H01M 8/241 204/253 |
| 8,679,305 B2 * | 3/2014 | Nakazawa | ................ | C25B 1/12 204/194 |
| 9,194,048 B2 * | 11/2015 | Haryu | ........................ | C25B 1/04 |
| 2003/0235723 A1 * | 12/2003 | Simpkins | .................. | F16F 9/04 429/459 |
| 2004/0265659 A1 * | 12/2004 | Richardson | ............... | F16F 9/02 429/444 |
| 2006/0254907 A1 * | 11/2006 | Taruya | ...................... | C25B 1/12 204/266 |
| 2008/0090140 A1 * | 4/2008 | Dalton | .................. | H01M 8/241 429/160 |
| 2012/0217156 A1 * | 8/2012 | Nakazawa | ................ | C25B 1/12 204/258 |

FOREIGN PATENT DOCUMENTS

JP 2003-160891 6/2003

* cited by examiner

*Primary Examiner* — Harry D Wilkins, III
(74) *Attorney, Agent, or Firm* — Mori & Ward, LLP

(57) ABSTRACT

A differential pressure water electrolysis apparatus includes a cell unit, a first end plate, a second end plate, and a pressing mechanism. The pressing mechanism is provided between the first end plate and a first end of the cell unit to press the cell unit in a stacking direction and includes a first corrosion-resistant member, a second corrosion-resistant member, a third corrosion-resistant member, and a pressure-resistant member. The first corrosion-resistant member is connected to the first end plate. The second corrosion-resistant member is engaged with the first end of the cell unit and is movable in the stacking direction. The third corrosion-resistant member is connected to the first corrosion-resistant member or the second corrosion-resistant member and covers an outer peripheral part of the first corrosion-resistant member and an outer peripheral part of the second corrosion-resistant member to provide a fluid introduction chamber communicating with a cathode side.

5 Claims, 5 Drawing Sheets

DIFFERENTIAL PRESSURE WATER ELECTROLYSIS APPARATUS

CROSS-REFERENCE TO RELATED APPLICATIONS

The present application claims priority under 35 U.S.C. §119 to Japanese Patent Application No. 2013-229635, filed Nov. 5, 2013, entitled "Differential Pressure Type High-Pressure Water Electrolysis Apparatus." The contents of this application are incorporated herein by reference in their entirety.

BACKGROUND

1. Field

The present disclosure relates to a differential pressure water electrolysis apparatus.

2. Description of the Related Art

For example, hydrogen gas is used as fuel gas for generating electric power in a fuel cell. In general, a water electrolysis apparatus is used to produce hydrogen. This water electrolysis apparatus uses a solid polymer electrolyte membrane (ion-exchange membrane) to decompose water to generate hydrogen (and oxygen). Electrode catalyst layers are provided on both sides of the solid polymer electrolyte membrane to form an electrolyte membrane-electrode assembly, and current collectors are provided on both sides of the electrolyte membrane-electrode assembly to form a unit cell.

A plurality of unit cells are stacked to form a cell unit. A voltage is applied to both ends in the stacking direction of the cell unit while water is supplied to the current collectors on the anode side. Thus, on the anode side of the electrolyte membrane-electrode assembly, the water is decomposed to produce hydrogen ions (protons). The hydrogen ions move through the solid polymer electrolyte membrane to the cathode side and combine with electrons to produce hydrogen. On the anode side, oxygen produced together with hydrogen is discharged with excess water from the cell unit.

In this equipment, stable electrolysis performance needs to be maintained by applying a constant clamping pressure to the cell unit in the stacking direction. So, for example, in Japanese Unexamined Patent Application Publication No. 2003-160891, as shown in FIG. 5, a clamping apparatus 4 for clamping a stack of an anode main electrode 1, a plurality of unit cells 2, and a cathode main electrode 3 in the stacking direction is provided. The clamping apparatus 4 includes a cylinder 6 having an inlet nozzle 5a and an outlet nozzle 5b for compression fluid, and a piston 8 slidably disposed in a cylinder chamber 6a of the cylinder 6 with O-rings 7 therebetween.

The clamping apparatus 4 applies a pressure higher than the pressure of hydrogen produced during the operation of the water electrolysis cell by a constant clamping pressure, with the piston 8. That is, by adjusting regulating valves (not shown) connected to the inlet nozzle 5a and the outlet nozzle 5b for compression fluid, a constant clamping pressure is secured.

SUMMARY

According to one aspect of the present invention, a differential pressure water electrolysis apparatus includes a plurality of unit cells, first and second end plates, and a pressing mechanism. The plurality of unit cells are stacked to form a cell unit. Each unit cell includes an electrolyte membrane-electrode assembly and separators stacked on one another. The electrolyte membrane-electrode assembly includes an electrolyte membrane provided with an anode current collector on one side thereof and a cathode current collector on the other side thereof. The first and second end plates are disposed at both ends in a stacking direction of the cell unit. The pressing mechanism is provided between the first end plate and the cell unit and presses the whole cell unit in the stacking direction. The differential pressure water electrolysis apparatus electrolyzes water to produce oxygen on an anode side and hydrogen at a pressure higher than the pressure of the oxygen on a cathode side. The pressing mechanism includes a first corrosion-resistant member fixed to the first end plate, a second corrosion-resistant member that is disposed opposite the first corrosion-resistant member movably back and forth in the stacking direction and that functions as a piston, a third corrosion-resistant member that is fixed to the first corrosion-resistant member or the second corrosion-resistant member and that integrally covers the outer peripheral part of the first corrosion-resistant member and the outer peripheral part of the second corrosion-resistant member to form a fluid introduction chamber communicating with the cathode side, and a pressure-resistant member provided on the outer peripheral part of the third corrosion-resistant member and holding the pressure in the fluid introduction chamber.

According to another aspect of the present invention, a differential pressure water electrolysis apparatus includes a cell unit, a first end plate, a second end plate, and a pressing mechanism. The cell unit includes unit cells stacked in a stacking direction and has a first end and a second end opposite to the first end in the stacking direction. Each of the unit cells includes an electrolyte membrane-electrode assembly and separators. The electrolyte membrane-electrode assembly includes an electrolyte membrane, an anode current collector, and a cathode current collector. The electrolyte membrane has a first side and a second side opposite to the first side in the stacking direction. The anode current collector is provided on the first side of the electrolyte membrane. The cathode current collector is provided on the second side of the electrolyte membrane. The separators are stacked together with the electrolyte membrane-electrode assembly in the stacking direction. The first end plate is disposed at the first end of the cell unit. The second end plate is disposed at the second end of the cell unit. The differential pressure water electrolysis apparatus is configured to electrolyze water to produce oxygen on an anode side and hydrogen on a cathode side. A pressure of the hydrogen is higher than a pressure of the oxygen. The pressing mechanism is provided between the first end plate and the first end of the cell unit to press the cell unit in the stacking direction and includes a first corrosion-resistant member, a second corrosion-resistant member, a third corrosion-resistant member, and a pressure-resistant member. The first corrosion-resistant member is connected to the first end plate. The second corrosion-resistant member is engaged with the first end of the cell unit and is movable in the stacking direction. The third corrosion-resistant member is connected to the first corrosion-resistant member or the second corrosion-resistant member and covers an outer peripheral part of the first corrosion-resistant member and an outer peripheral part of the second corrosion-resistant member to provide a fluid introduction chamber communicating with the cathode side. The pressure-resistant member is provided on the outer peripheral part of the third corrosion-resistant member and holds a pressure in the fluid introduction chamber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
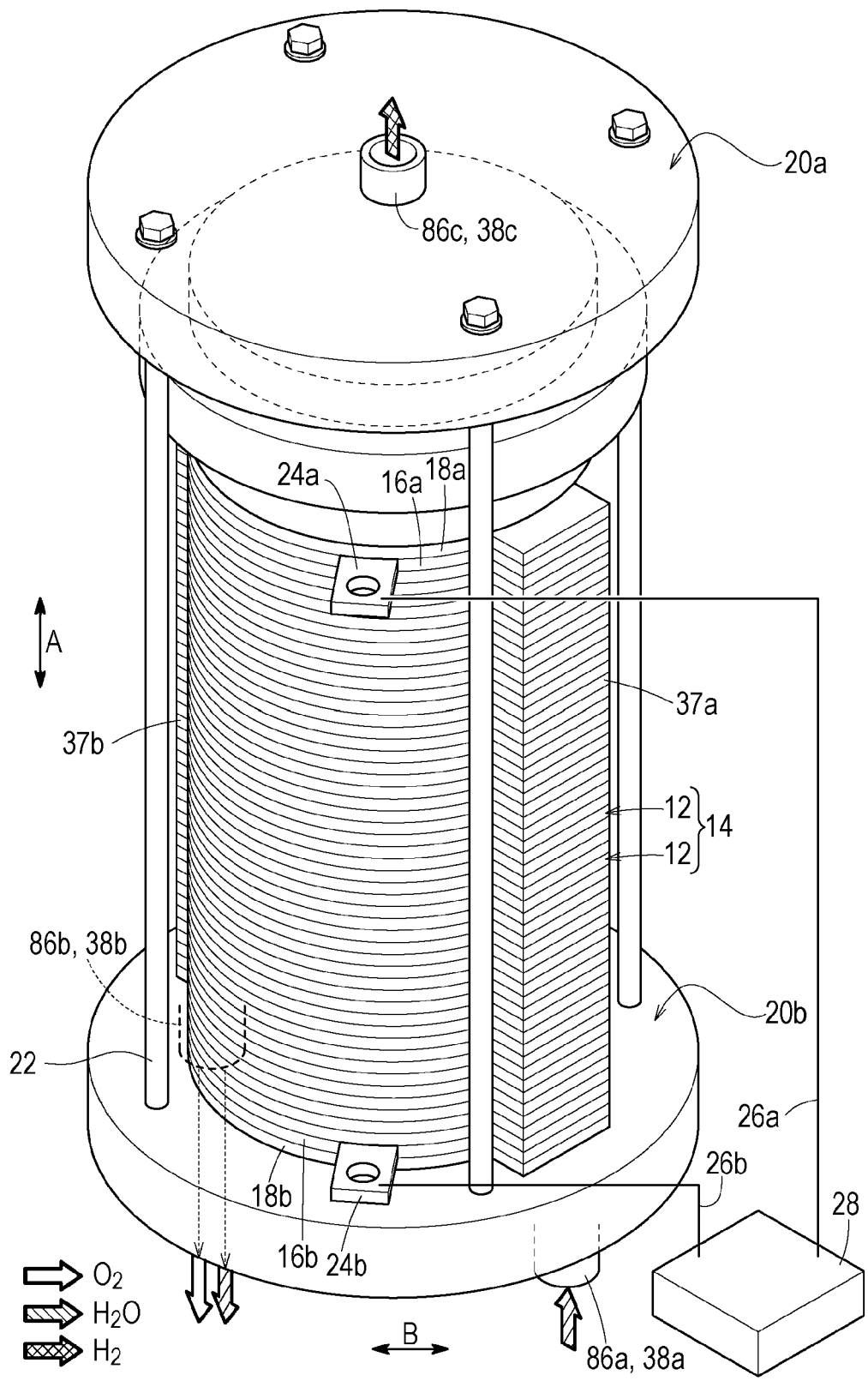
FIG. 1 is a perspective explanatory view of a differential pressure type high-pressure water electrolysis apparatus according to a first embodiment of the present disclosure.

The embodiments will now be described with reference to the accompanying drawings, wherein like reference numerals designate corresponding or identical elements throughout the various drawings.

As shown in FIG. 1, a differential pressure type high-pressure water electrolysis apparatus 10 according to a first embodiment of the present disclosure includes a cell unit 14 formed by stacking a plurality of unit cells 12 in the vertical direction (the direction of arrow A) or in the horizontal direction (the direction of arrow B).

A terminal plate 16a, an insulating plate 18a, and an end plate 20a are sequentially disposed at one end in the stacking direction of the cell unit 14. Similarly, a terminal plate 16b, an insulating plate 18b, and an end plate 20b are sequentially disposed at the other end in the stacking direction of the cell unit 14.

In the differential pressure type high-pressure water electrolysis apparatus 10, components between the disk-shaped end plates 20a and 20b are clamped together, for example, by a plurality of tie rods 22 extending in the direction of arrow A. Alternatively, the components between the end plates 20a and 20b may be held together in a box-like casing (not shown) having the end plates 20a and 20b as its parts. Although the differential pressure type high-pressure water electrolysis apparatus 10 is substantially cylindrical in overall shape, it may be cubic or of other shapes.

The terminal plates 16a and 16b are provided with terminals 24a and 24b, respectively, protruding outward from their sides. The terminals 24a and 24b are electrically connected through wires 26a and 26b, respectively, to an electrolysis power source 28.

Figure 2:
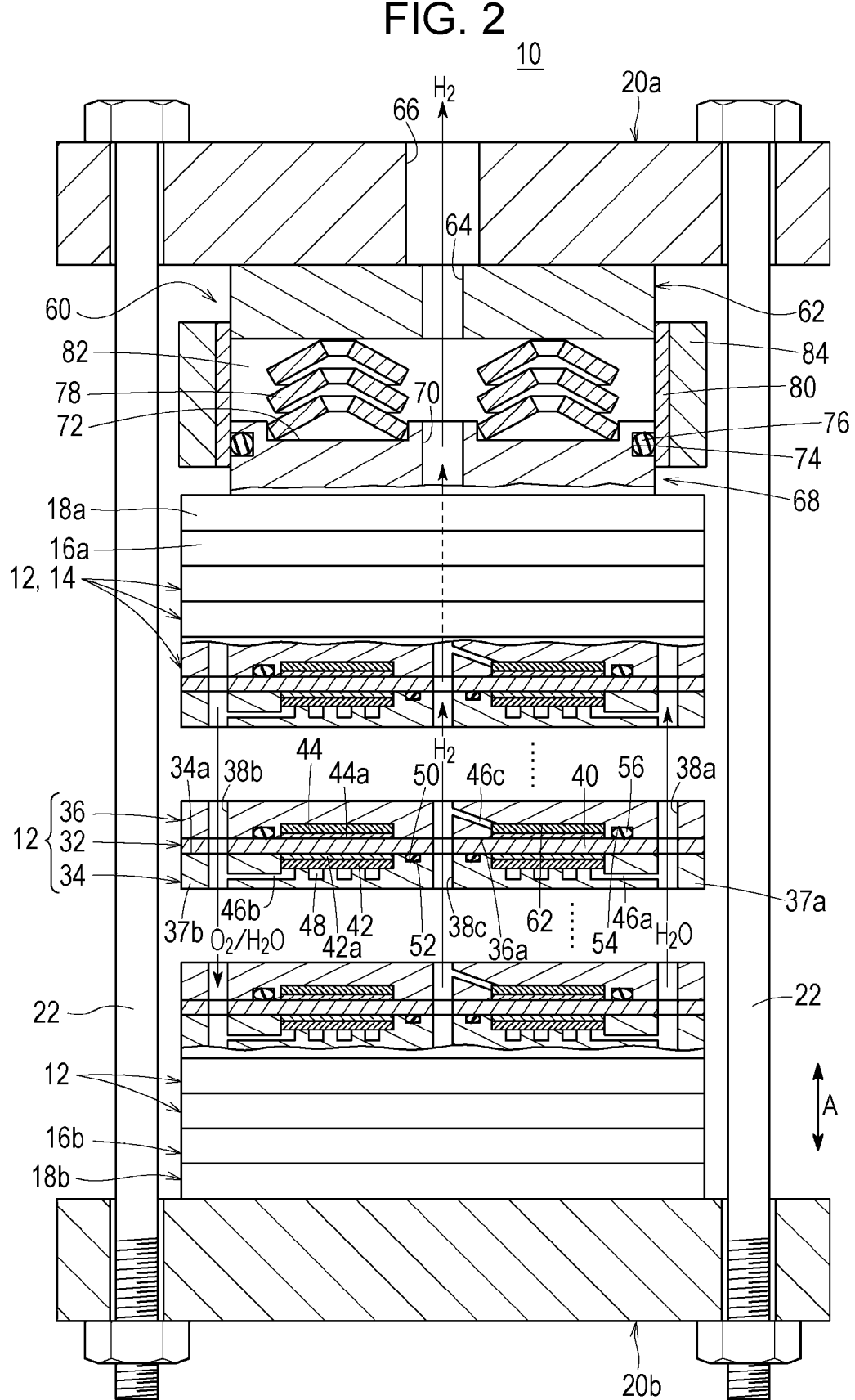
FIG. 2 is a cross-sectional explanatory view of the main part of the differential pressure type high-pressure water electrolysis apparatus.

As shown in FIG. 2, each unit cell 12 includes a disk-shaped electrolyte membrane-electrode assembly 32, an anode separator 34, and a cathode separator 36. The electrolyte membrane-electrode assembly 32 is sandwiched between the anode separator 34 and the cathode separator 36. As shown in FIG. 1, the unit cells 12 have a substantially disk shape, and first protruding portions 37a and second protruding portions 37b are formed in the outer peripheral edge parts thereof. The first protruding portions 37a and second protruding portions 37b protrude in opposite directions outward in the separator face direction.

As shown in FIG. 2, the first protruding portions 37a are provided with water supply manifolds 38a that communicate with one another in the stacking direction (the direction of arrow A) and that are configured to supply water (pure water) upward in the stacking direction. The second protruding portions 37b are provided with water discharge manifolds 38b that communicate with one another in the stacking direction and that are configured to discharge oxygen generated by reaction and unreacted water (mixed fluid) downward in the stacking direction.

Hydrogen discharge manifolds 38c are provided in the central parts of the unit cells 12. The hydrogen discharge manifolds 38c are formed through substantially the center of the electrolytic region, communicate with one another in the stacking direction, and are configured to discharge high-pressure (for example, 1 MPa to 70 MPa) hydrogen generated by reaction.

The anode separator 34 and the cathode separator 36 have a substantially disk shape, and are formed, for example, of a carbon material. The anode separator 34 and the cathode separator 36 may be formed by press-molding a steel plate, a stainless steel plate, a titanium plate, an aluminum plate, a plated steel plate, or any of these metal plates with a corrosion-resistant coating thereon. The anode separator 34 and the cathode separator 36 may be formed by cutting, and then applying a corrosion-resistant coating.

The electrolyte membrane-electrode assembly 32 includes a solid polymer electrolyte membrane 40 that is, for example, a thin perfluorosulfonic acid membrane impregnated with water. An anode electrode catalyst layer 42a and a cathode electrode catalyst layer 44a that have a ring shape are formed on both sides of the solid polymer electrolyte membrane 40. For example, the anode electrode catalyst layer 42a contains a ruthenium-based catalyst, and the cathode electrode catalyst layer 44a contains a platinum catalyst.

An anode current collector 42 and a cathode current collector 44 that have a ring shape are disposed on both sides of the solid polymer electrolyte membrane 40. The anode current collector 42 and the cathode current collector 44 are, for example, sintered bodies of spherical atomized titanium powder (porous conductors). The anode current collector 42 and the cathode current collector 44 are provided, for example, with smooth surface portions to be etched after grinding. The porosity of the anode current collector 42 and the cathode current collector 44 is set within a range of 10% to 46%, and preferably within a range of 20% to 40%.

The anode separator 34 is provided with a supply passage 46a communicating with the water supply manifold 38a, and a discharge passage 46b communicating with the water discharge manifold 38b. A water flow path 48 communicating with the supply passage 46a and the discharge passage 46b is formed in a surface 34a of the anode separator 34 facing the electrolyte membrane-electrode assembly 32. A seal groove portion 50 is formed in the surface 34a of the anode separator 34 so as to surround the hydrogen discharge manifold 38c. A seal member 52 is disposed in the seal groove portion 50.

A hydrogen discharge passage 46c is formed in a surface 36a of the cathode separator 36 facing the electrolyte membrane-electrode assembly 32. The cathode current collector 44 communicates through the hydrogen discharge passage 46c with the hydrogen discharge manifold 38c. A seal groove portion 54 is formed in the surface 36a of the cathode separator 36 so as to surround the cathode current collector 44. A seal member 56 is disposed in the seal groove portion 54.

A seal member having elasticity such as a seal material, a cushion material, a packing material, or the like formed of EPDM, NBR, fluorine-containing rubber, silicone rubber, fluorosilicone rubber, butyl rubber, natural rubber, styrene rubber, chloroprene, acrylic rubber, or the like is used as the seal members 52 and 56.

Figure 3:
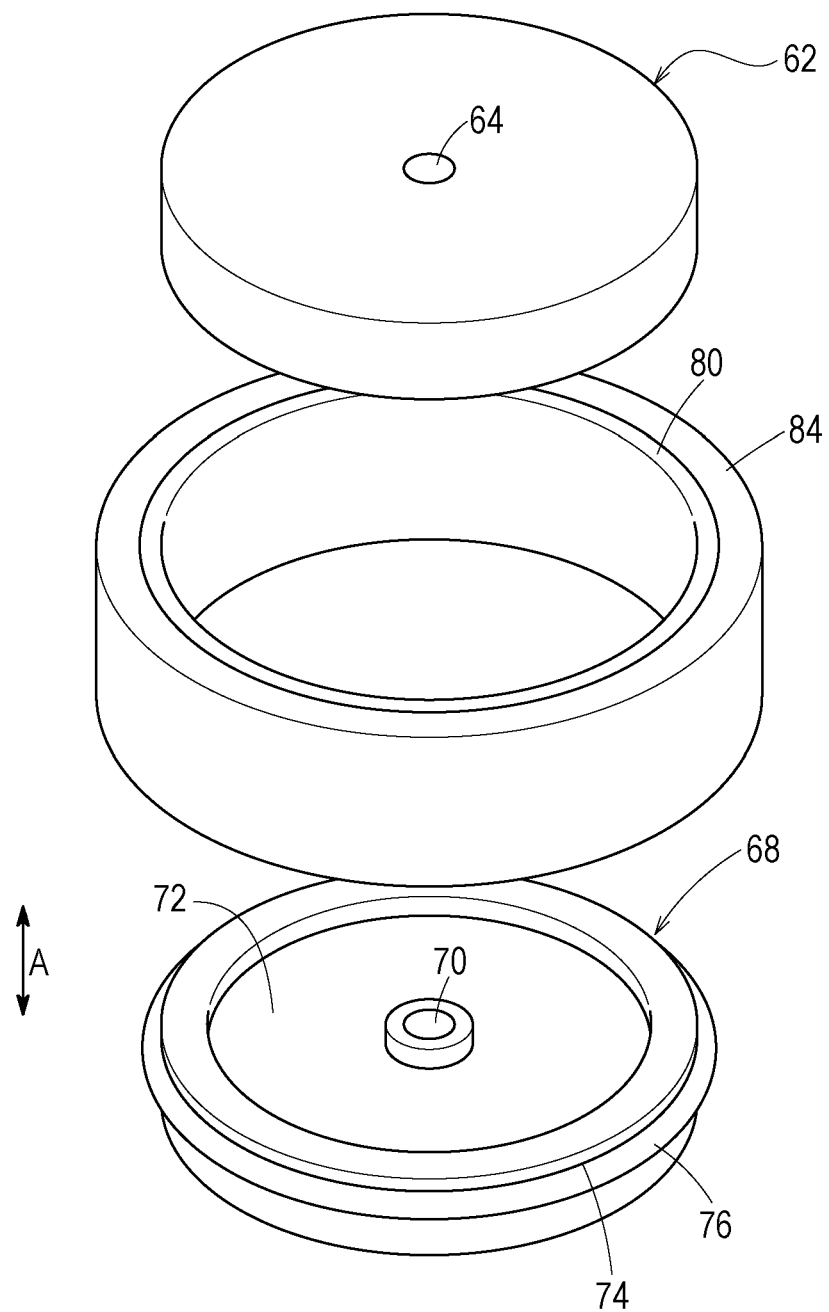
FIG. 3 is an exploded perspective explanatory view of the main part of a pressing mechanism constituting the differential pressure type high-pressure water electrolysis apparatus.

A pressing mechanism 60 that presses the whole cell unit 14 in the stacking direction (the direction of arrow A) is provided between the insulating plate 18a and the end plate 20a. As shown in FIG. 2 and FIG. 3, the pressing mechanism 60 includes a first corrosion-resistant member 62 that is fixed (for example, by welding) to the end plate 20a. The first corrosion-resistant member 62 is formed, for example, of a stainless steel material or titanium-based material. A second corrosion-resistant member 68 and a third corrosion-resistant member 80 described below are formed of the same material as the first corrosion-resistant member 62.

The first corrosion-resistant member 62 has a disk shape, and a hydrogen discharge hole portion (opening) 64 for discharging high-pressure hydrogen is formed in the central part thereof. The hydrogen discharge hole portion 64 communicates with a hydrogen hole portion 66 formed in the center of the end plate 20a (see FIG. 2).

The pressing mechanism 60 includes a second corrosion-resistant member 68 that is disposed opposite the first corrosion-resistant member 62 movably back and forth in the stacking direction and that functions as a piston. The second corrosion-resistant member 68 has a substantially disk shape, and a hydrogen introduction hole portion 70 communicating with the hydrogen discharge manifold 38c of the cell unit 14 is formed in the central part thereof. A ring-like recessed portion 72 is formed in a surface of the second corrosion-resistant member 68 that faces the first corrosion-resistant member 62, over the outer peripheral edge part thereof.

A circular groove 74 is formed in the outer peripheral part of the second corrosion-resistant member 68, and an O-ring 76 is disposed in the circular groove 74. Elastic bodies, such as disk springs 78, are disposed in the recessed portion 72 of the second corrosion-resistant member 68. The disk springs 78 are interposed between the second corrosion-resistant member 68 and the first corrosion-resistant member 62 while applying a predetermined elastic force.

The pressing mechanism 60 includes a third corrosion-resistant member 80 that is fixed to the outer peripheral part of the first corrosion-resistant member 62 (or the outer peripheral part of the second corrosion-resistant member 68). The third corrosion-resistant member 80 has a thin cylindrical shape. One axial end of the third corrosion-resistant member 80 is fixed to the outer peripheral part of the first corrosion-resistant member 62. The outer peripheral part of the second corrosion-resistant member 68 is slidably fitted in the other axial end of the third corrosion-resistant member 80 with an O-ring 76 therebetween.

When the third corrosion-resistant member 80 is fixed to the outer peripheral part of the second corrosion-resistant member 68, an O-ring 76 is provided in the outer peripheral part of the first corrosion-resistant member 62, and the third corrosion-resistant member 80 is slidable relative to the first corrosion-resistant member 62. The third corrosion-resistant member 80 may be slidably fitted on the outer peripheral part of the first corrosion-resistant member 62 with an O-ring 76 in between, and on the outer peripheral part of the second corrosion-resistant member 68 with an O-ring 76 in between.

The third corrosion-resistant member 80 integrally covers the outer peripheral part of the first corrosion-resistant member 62 and the outer peripheral part of the second corrosion-resistant member 68, thereby forming a fluid introduction chamber 82 communicating with the cathode side. One end side of the fluid introduction chamber 82 communicates through the recessed portion 72 and the hydrogen introduction hole portion 70 with the hydrogen discharge manifold 38c of the cell unit 14. The other end side of the fluid introduction chamber 82 communicates through the hydrogen discharge hole portion 64 with the hydrogen hole portion 66 of the end plate 20a.

A pressure-resistant member 84 that holds the pressure in the fluid introduction chamber 82 is provided on the outer peripheral part of the third corrosion-resistant member 80. The pressure-resistant member 84 has a cylindrical shape and is formed, for example, of an iron-based steel material having high strength. The third corrosion-resistant member 80 is fixed, for example, to the inner peripheral surface of the pressure-resistant member 84 by press-fitting.

As shown in FIG. 1, pipes 86a and 86b communicating with the water supply manifold 38a and the water discharge manifold 38b are connected to the end plate 20b. A pipe 86c communicating with the hydrogen discharge manifold 38c is connected to the end plate 20a. Although not shown, the pipe 86c is provided with a back pressure valve (or solenoid valve), and the pressure of hydrogen generated in the hydrogen discharge communication hole 38c can be maintained at a high pressure.

The operation of the differential pressure type high-pressure water electrolysis apparatus 10 configured as above will be described.

As shown in FIG. 1, water is supplied from the pipe 86a to the water supply manifold 38a of the differential pressure type high-pressure water electrolysis apparatus 10 while a voltage is applied between the terminals 24a and 24b of the terminal plates 16a and 16b from the electrolysis power source 28 electrically connected thereto. Thus, as shown in FIG. 2, in each unit cell 12, the water is supplied from the water supply manifold 38a to the water flow path 48 of the anode separator 34 and moves along the inside of the anode current collector 42.

Therefore, the water is electrically decomposed in the anode electrode catalyst layer 42a, and hydrogen ions, electrons, and oxygen are generated. The hydrogen ions generated by the anode reaction pass through the solid polymer electrolyte membrane 40 to the cathode electrode catalyst layer 44a and combine with electrons to form hydrogen.

Therefore, the hydrogen flows along a hydrogen flow path in the cathode current collector 44. While being kept at a pressure higher than that in the water supply manifold 38a, the hydrogen flows through the hydrogen discharge manifold 38c and is introduced into the fluid introduction chamber 82 of the pressing mechanism 60.

In the pressing mechanism 60, the clamping pressure exerted by the second corrosion-resistant member 68 on the cell unit 14 is adjusted by the pressure of hydrogen introduced into the fluid introduction chamber 82 and the elastic force of the disk springs 78. The pressure of hydrogen is increased to a set pressure of a back pressure valve (not shown), and hydrogen can be taken out of the differential pressure type high-pressure water electrolysis apparatus 10. On the other hand, oxygen generated by reaction and unreacted water are discharged out of the differential pressure type high-pressure water electrolysis apparatus 10 along the water discharge manifold 38b.

In this case, in the first embodiment, as shown in FIG. 2, the pressing mechanism 60 includes the first corrosion-resistant member 62, the second corrosion-resistant member 68, and the third corrosion-resistant member 80. The third corrosion-resistant member 80 integrally covers the outer peripheral part of the first corrosion-resistant member 62 and the outer peripheral part of the second corrosion-resistant member 68, thereby forming the fluid introduction chamber 82. In addition, the pressure-resistant member 84 is provided on the outer peripheral part of the third corrosion-resistant member 80.

As described above, a member is divided into parts requiring corrosion resistance (the first corrosion-resistant member 62, the second corrosion-resistant member 68, and the third corrosion-resistant member 80) and a part requiring pressure resistance (the pressure-resistant member 84). Therefore, the first corrosion-resistant member 62, the second corrosion-resistant member 68, the third corrosion-resistant member 80, and the pressure-resistant member 84, which are all members, have a disk shape or a cylindrical shape, machining cost is reduced, and assembly workability is improved.

Since the third corrosion-resistant member 80 is fixed to the inner peripheral surface of the pressure-resistant member 84 by press fitting, the third corrosion-resistant member 80 only has to function as a corrosion-resistant layer, and can be minimized in thickness. Therefore, the amount of high-cost corrosion-resistant material used is minimized. Thereby, the structure is simplified, and desired corrosion resistant function and pressure-resistant function can be retained with a lightweight and economic configuration.

Figure 4:
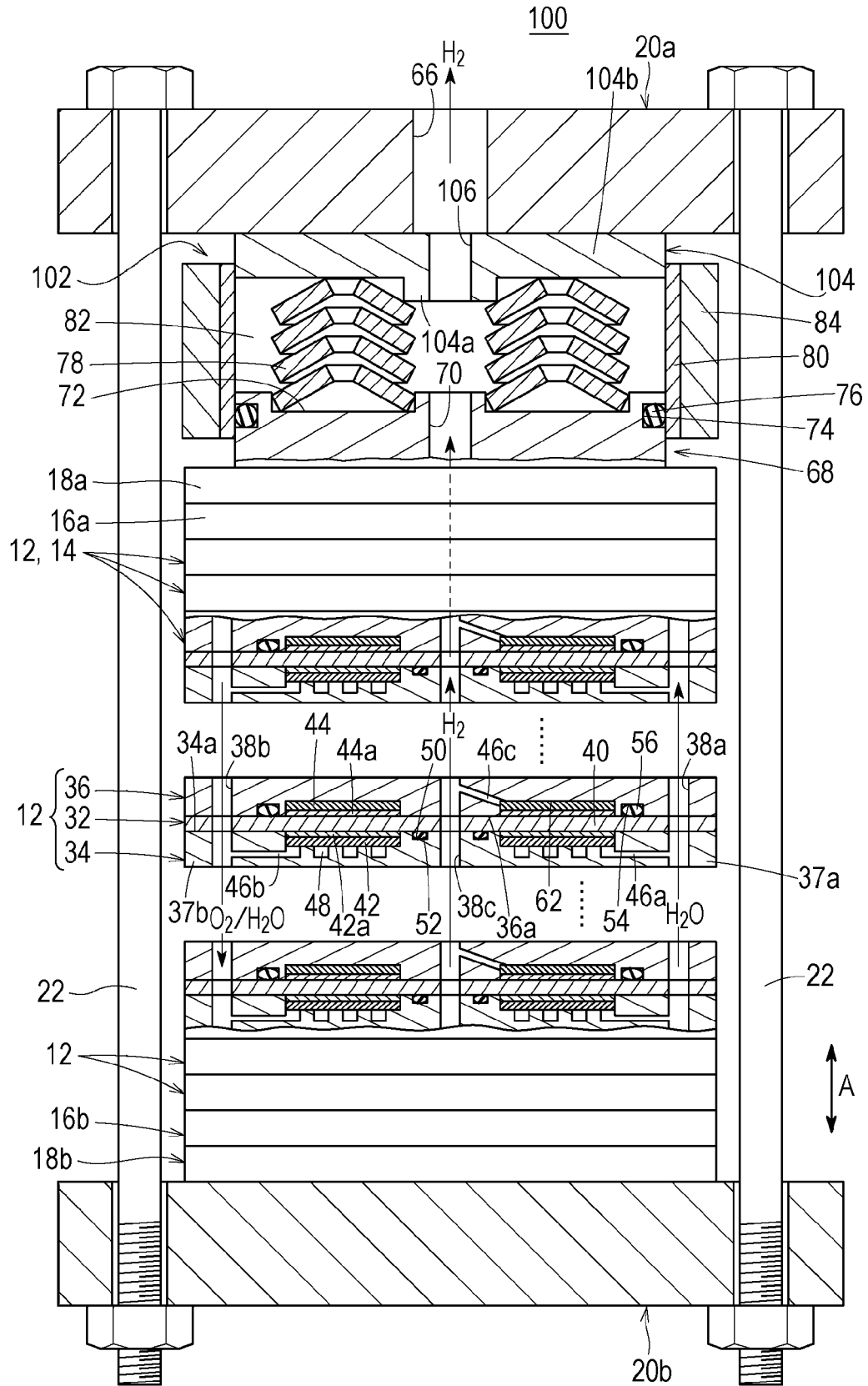
FIG. 4 is a cross-sectional explanatory view of the main part of a differential pressure type high-pressure water electrolysis apparatus according to a second embodiment of the present disclosure.
Figure 5:
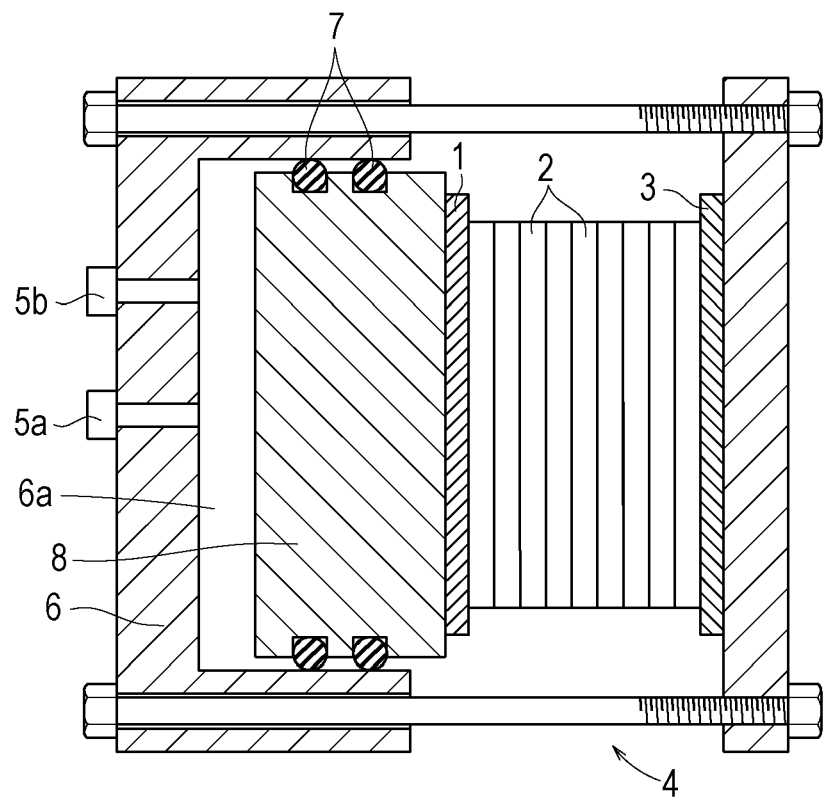
FIG. 5 is an explanatory view of a water electrolysis cell disclosed in Japanese Unexamined Patent Application Publication No. 2003-160891.

FIG. 4 is a cross-sectional explanatory view of the main part of a differential pressure type high-pressure water electrolysis apparatus 100 according to a second embodiment of the present disclosure. The same reference signs will be used to designate the same components as those of the differential pressure type high-pressure water electrolysis apparatus 10 according to the first embodiment, and the detailed description thereof will be omitted.

The differential pressure type high-pressure water electrolysis apparatus 100 employs a pressing mechanism 102 instead of the pressing mechanism 60. The pressing mechanism 102 includes a first corrosion-resistant member 104. The first corrosion-resistant member 104 has a substantially disk shape, and a hydrogen discharge hole portion (opening) 106 is formed in the central part thereof.

The thickness of a region of the first corrosion-resistant member 104 where the hydrogen discharge hole portion 106 is provided is larger than the thickness of the other region. Specifically, a thick portion 104a protruding in the thickness direction is formed in the central part of the first corrosion-resistant member 104, and a thin portion 104b thinner than the thick portion 104a is provided in the other part. The hydrogen discharge hole portion 106 is formed in the thick portion 104a.

In the second embodiment configured as above, the first corrosion-resistant member 104 is provided with the thick portion 104a only in a part thereof around the hydrogen discharge hole portion 106 that requires pressure resistant structure. Therefore, the thin portion 104b can be provided in the other part of the first corrosion-resistant member 104, and the amount of high-cost corrosion-resistant member used is further reduced.

In an aspect of the present disclosure, a differential pressure type high-pressure water electrolysis apparatus includes a plurality of unit cells stacked to form a cell unit. Each unit cell includes an electrolyte membrane-electrode assembly and separators stacked on one another. The electrolyte membrane-electrode assembly includes an electrolyte membrane provided with an anode current collector on one side thereof and a cathode current collector on the other side thereof. First and second end plates are disposed at both ends in a stacking direction of the cell unit. A pressing mechanism that presses the whole cell unit in the stacking direction is provided between the first end plate and the cell unit and. The differential pressure type high-pressure water electrolysis apparatus electrolyzes water to produce oxygen on an anode side and hydrogen at a pressure higher than the pressure of the oxygen on a cathode side.

The pressing mechanism includes a first corrosion-resistant member fixed to the first end plate, and a second corrosion-resistant member that is disposed opposite the first corrosion-resistant member movably back and forth in the stacking direction and that functions as a piston. A third corrosion-resistant member that integrally covers the outer peripheral part of the first corrosion-resistant member and the outer peripheral part of the second corrosion-resistant member to form a fluid introduction chamber communicating with the cathode side is fixed to the first corrosion-resistant member or the second corrosion-resistant member. A pressure-resistant member that holds the pressure in the fluid introduction chamber is provided on the outer peripheral part of the third corrosion-resistant member.

In the differential pressure type high-pressure water electrolysis apparatus, the first corrosion-resistant member preferably has an opening connecting the first end plate and the fluid introduction chamber. In that case, the thickness of a region of the first corrosion-resistant member where the opening is provided is preferably larger than the thickness of the other region of the first corrosion-resistant member.

According to the present disclosure, a fluid introduction chamber is formed by a first corrosion-resistant member, a second corrosion-resistant member, and a third corrosion-resistant member, and a pressure-resistant member is provided on the outer peripheral part of the third corrosion-resistant member. By dividing a member into a part requiring corrosion resistance and a part requiring pressure resistance, the amount of high-cost corrosion-resistant material used is minimized. Therefore, the structure is simplified, and desired corrosion resistant function and pressure-resistant function can be retained with a lightweight and economic configuration.

Obviously, numerous modifications and variations of the present invention are possible in light of the above teachings. It is therefore to be understood that within the scope of the appended claims, the invention may be practiced otherwise than as specifically described herein.

What is claimed is:

1. A differential pressure water electrolysis apparatus comprising:
    a plurality of unit cells stacked to form a cell unit, each unit cell including an electrolyte membrane-electrode assembly and separators stacked on one another, the electrolyte membrane-electrode assembly including an electrolyte membrane provided with an anode current collector on one side thereof and a cathode current collector on the other side thereof;
    first and second end plates disposed at both ends in a stacking direction of the cell unit; and
    a pressing mechanism provided between the first end plate and the cell unit and pressing the whole cell unit in the stacking direction,
    the differential pressure water electrolysis apparatus electrolyzing water to produce oxygen on an anode side and hydrogen at a pressure higher than the pressure of the oxygen on a cathode side,
    wherein the pressing mechanism includes
    a first corrosion-resistant member fixed to the first end plate,
    a second corrosion-resistant member that is disposed opposite the first corrosion-resistant member movably back and forth in the stacking direction and that functions as a piston, a third corrosion-resistant member that is fixed to the first corrosion-resistant member or the second corrosion-resistant member and that integrally covers the outer peripheral part of the first corrosion-resistant member and the outer peripheral part of the second corrosion-resistant member to form a fluid introduction chamber communicating with the cathode side, and a pressure-resistant member provided on the outer peripheral part of the third corrosion-resistant member and holding the pressure in the fluid introduction chamber.

2. The differential pressure water electrolysis apparatus according to claim 1, wherein the first corrosion-resistant member has an opening connecting the first end plate and the fluid introduction chamber, and the thickness of a region of the first corrosion-resistant member where the opening is provided is larger than the thickness of the other region of the first corrosion-resistant member.

3. A differential pressure water electrolysis apparatus comprising:

a cell unit comprising unit cells stacked in a stacking direction and having a first end and a second end opposite to the first end in the stacking direction, each of the unit cells comprising:

an electrolyte membrane-electrode assembly comprising:

an electrolyte membrane having a first side and a second side opposite to the first side in the stacking direction;

an anode current collector provided on the first side of the electrolyte membrane; and a cathode current collector provided on the second side of the electrolyte membrane; and separators stacked together with the electrolyte membrane-electrode assembly in the stacking direction;

a first end plate disposed at the first end of the cell unit;

a second end plate disposed at the second end of the cell unit;

the differential pressure water electrolysis apparatus being configured to electrolyze water to produce oxygen on an anode side and hydrogen on a cathode side, a pressure of the hydrogen being higher than a pressure of the oxygen; and a pressing mechanism provided between the first end plate and the first end of the cell unit to press the cell unit in the stacking direction and comprising:

a first corrosion-resistant member connected to the first end plate;

a second corrosion-resistant member engaged with the first end of the cell unit and being movable in the stacking direction;

a third corrosion-resistant member connected to the first corrosion-resistant member or the second corrosion-resistant member and covering an outer peripheral part of the first corrosion-resistant member and an outer peripheral part of the second corrosion-resistant member to provide a fluid introduction chamber communicating with the cathode side; and a pressure-resistant member provided on the outer peripheral part of the third corrosion-resistant member and holding a pressure in the fluid introduction chamber.

4. The differential pressure water electrolysis apparatus according to claim 3, wherein the first corrosion-resistant member has an opening connecting the first end plate and the fluid introduction chamber, and a thickness of a region of the first corrosion-resistant member where the opening is provided is larger than a thickness of another region of the first corrosion-resistant member.

5. The differential pressure water electrolysis apparatus according to claim 3, wherein a recessed portion is provided in a surface of the second corrosion-resistant member that faces the first corrosion-resistant member, and an elastic body is disposed in the recessed portion, and wherein the elastic body is interposed between the second corrosion-resistant member and the first corrosion-resistant member while applying a predetermined elastic force.

\* \* \* \* \*